United States Patent
Sheelvant et al.

(10) Patent No.: US 12,197,468 B2
(45) Date of Patent: Jan. 14, 2025

(54) TECHNIQUES FOR IMPLEMENTING MODIFICATIONS TO A STRETCHED RESOURCE GROUP

(71) Applicant: Dell Products L.P., Hopkinton, MA (US)

(72) Inventors: Girish Sheelvant, Hopkinton, MA (US); Dmitry Tylik, Westborough, MA (US); Vasudevan Subramanian, Chapel Hill, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/133,556

(22) Filed: Apr. 12, 2023

(65) Prior Publication Data

US 2024/0346045 A1      Oct. 17, 2024

(51) Int. Cl.
| | | |
|---|---|---|
| *G06F 16/00* | (2019.01) | |
| *G06F 11/14* | (2006.01) | |
| *G06F 11/20* | (2006.01) | |
| *G06F 16/23* | (2019.01) | |
| *G06F 16/27* | (2019.01) | |
| *G06F 3/06*  | (2006.01) | |

(52) U.S. Cl.
CPC ........ *G06F 16/275* (2019.01); *G06F 11/1451* (2013.01); *G06F 11/2076* (2013.01); *G06F 11/2082* (2013.01); *G06F 16/2379* (2019.01); *G06F 16/278* (2019.01); *G06F 3/065* (2013.01)

(58) Field of Classification Search
None
See application file for complete search history.

(56) References Cited

U.S. PATENT DOCUMENTS

| | | | |
|---|---|---|---|
| 8,838,539 B1 * | 9/2014 | Ashcraft | H04L 67/01 |
| | | | 707/637 |
| 11,392,329 B1 * | 7/2022 | Tylik | G06F 3/0683 |
| 11,513,684 B1 * | 11/2022 | Tylik | G06F 3/0644 |
| 2004/0133591 A1 * | 7/2004 | Holenstein | G06F 11/2064 |
| | | | 707/999.102 |

(Continued)

OTHER PUBLICATIONS

Dell EMC SRDF Introduction, Sep. 2019 (Year: 2019).*

*Primary Examiner* — Polina G Peach
(74) *Attorney, Agent, or Firm* — Muirhead and Saturnelli, LLC

(57) ABSTRACT

Techniques can include: establishing a synchronous replication configuration for a group of stretched resources configured for bi-directional synchronous replication between a first site and a second site; and performing processing to implement a change or modification operation of the group of one or more existing stretched resources. The processing can include performing a three phase workflow comprising: a preparation phase that prepares the group for the change or modification operation of the group; a commitment phase that commits the change or modification operation to the group; and a synchronization phase that synchronizes content of the group in accordance with the change or modification operation to the group. Each stretched resource of the group can be configured from local resources of the first and second sites where such local resources have the same identity when exposed to an external host over paths from the first and second sites.

16 Claims, 9 Drawing Sheets

(56) References Cited

U.S. PATENT DOCUMENTS

| | | | |
|---|---|---|---|
| 2008/0104347 A1* | 5/2008 | Iwamura | G06F 3/0619 |
| | | | 711/E12.103 |
| 2010/0205392 A1* | 8/2010 | Schnapp | G06F 3/067 |
| | | | 711/E12.001 |
| 2013/0086349 A1* | 4/2013 | Kaiya | G06F 3/0619 |
| | | | 711/164 |
| 2018/0067698 A1* | 3/2018 | Prasad | G06F 11/203 |
| 2019/0303017 A1* | 10/2019 | LeCrone | G06F 3/0619 |
| 2019/0324663 A1* | 10/2019 | Kass | G06F 1/14 |
| 2020/0026429 A1* | 1/2020 | Chen | G06F 3/065 |
| 2020/0097180 A1* | 3/2020 | Hironaka | G06F 3/0619 |
| 2020/0301886 A1* | 9/2020 | Narasingarayanapeta | |
| | | | G06F 21/6218 |
| 2022/0004542 A1* | 1/2022 | Han | G06F 16/27 |
| 2022/0043577 A1* | 2/2022 | Doucette | G06F 3/067 |
| 2022/0100379 A1* | 3/2022 | O'Halloran | G06F 3/065 |
| 2022/0291851 A1* | 9/2022 | Tylik | G06F 3/065 |
| 2022/0334775 A1* | 10/2022 | Stotski | G06F 3/0644 |
| 2022/0342548 A1* | 10/2022 | Tylik | G06F 3/0647 |
| 2023/0004299 A1* | 1/2023 | Dailey | G06F 3/0614 |
| 2023/0009529 A1* | 1/2023 | Meiri | G06F 12/10 |

* cited by examiner

300 ↴

302 — The metro replication configuration with respect to the group of stretched resources transitions into bias mode. The sites A and B of the metro replication configuration may already be in bias mode or may transition from a witness mode to bias mode. When in the witness mode, a third system or site C can serve as a witness which is in communication with the sites A and B, where the witness can facilitate selection of a single one of the sites A and B which continues servicing I/Os directed to the group members responsive to a replication failure or fracture with respect to the group.

Transitioning from witness mode to bias mode can include disengaging the witness from its witness role in connection with selecting the foregoing single site responsive to a replication failure or fracture with respect to the group.

When in bias mode, only the preferred site can win or be selected as the single site which continues servicing I/Os directed to the group members responsive to a replication failure or fracture with respect to the group.

304 — The metro group transitions from active-active mode to active-passive mode. In active-passive mode, a host can issue I/Os, which are directed to members of the group, to only the preferred site but not to the non-preferred site. Transitioning to the active-passive mode can include modifying a path state of any/all paths to the non-preferred site exposing the stretched resources of the group from active to passive. I/Os, which are directed to a member of the group and which are issued from the host over a passive path to the non-preferred site, are not serviced.

FIG. 8

TECHNIQUES FOR IMPLEMENTING MODIFICATIONS TO A STRETCHED RESOURCE GROUP

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: establishing a synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host, wherein the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous wherein there is synchronous replication of writes from the first local resource of the first site to the second local resource of the second site for said each existing stretched resource, and synchronous replication of writes from the second local resource of the second site to the first local resource of the first site for said each existing stretched resource; and performing first processing to implement a change or modification operation of the group of one or more existing stretched resources, wherein said first processing includes: performing a preparation phase that prepares the group for the change or modification operation of the group; performing a commitment phase that commits the change or modification operation to the group; and performing a synchronization phase that synchronizes content of the group in accordance with the change or modification operation to the group.

In at least one embodiment, the first site can be configured as a preferred site and the second site can be configured as a non-preferred site. Prior to performing said first processing, the one or more existing stretched resources of the group can be in an active-active mode in the synchronous replication configuration wherein the first path can be configured as active with respect to the one or more existing stretched resources of the group so the host issues I/Os directed to the one or more existing stretched resources of the group over the first path, and wherein the second path can be configured as active with respect to the one or more existing stretched resources of the group so the host issues I/Os directed to the one or more existing stretched resources of the group over the second path.

In at least one embodiment, the preparation phase can include: configuring the first site and the second site in a bias mode with respect to the synchronous replication configuration for the group, wherein when in the bias mode, a specified one of the first site and the second site currently configured as the preferred site is designated as a single site which services I/Os directed to stretched resources of the group responsive to a failure or fracture of replication with respect to the group, and wherein when in the bias mode and responsive to a failure or fracture of replication with respect to the group, the non-preferred site is unavailable for servicing I/Os directed to any stretched resource of the group; and transitioning the one or more existing stretched resources of the group into an active-passive mode in the synchronous replication configuration wherein the first path to the first site, designated as the preferred site, is configured as active with respect to the one or more existing stretched resources of the group where the host issues I/Os directed to the one or more existing stretched resources of the group over the first path, and wherein the second path to the second site, designated as the non-preferred site, is configured as passive with respect to the one or more existing stretched resources of the group where the host is unable issue I/Os directed to the one or more existing stretched resources of the group over the second path. Configuring the first site and the second site in the bias mode can include transitioning the first site and the second site from a witness mode to the bias mode. Processing can include transitioning from the bias mode back to the witness mode. When in the witness mode, a third site or system can serve as a witness and can be configured for communication with the first site and the second site, and wherein responsive to a failure or fracture of replication with respect to the group, the witness can be used in deciding which of the first site and the second site continues servicing I/Os directed to stretched resources of the group.

In at least one embodiment, the commitment phase can include: committing the change or modification operation to a first management database on the first site; and committing the change or modification operation to a second management database on the second site. The synchronization phase can include synchronizing content of a first stretched resource of the group between a corresponding first local resource of the first site and a corresponding second local resource of the second site. The first stretched resource can be added as a new stretched resource to the group by the change or modification operation of the group. The synchronization phase can further include transitioning a replication session associated with the group to a synchronization in progress state indicating that content is not synchronized for at least the first stretched resource of the group. When in the synchronization in progress state of the synchronization phase, bi-directional or two-way synchronous replication as between the first site and the second site may not yet be established for the new stretched resource being added to the group. When in the synchronization in progress state of the synchronization phase, bi-directional or two-way synchronous replication as between the first site and the second site can remain established for each of the one or more existing stretched resources which are members of the group prior to performing said first processing to implement the change or modification operation of the group. The first stretched resource can be configured from a corresponding first local resource of the first site and a corresponding second local resource of the second site, and wherein the corresponding first local resource can include content prior to adding the first stretched resource to the group, and wherein the synchronization phase can include copying content from the corresponding first local resource to the corresponding second local resource.

In at least one embodiment, the first stretched resource can be a first of the one or more existing stretched resources of the group which is changed or modified by the change or modification operation of the group. The synchronization phase can include transitioning a replication session associated with the group to a synchronization in progress state indicating that content is not synchronized for at least the first stretched resource of the group. The synchronization phase can include: determining that content of the first stretched resource of the group having a first identity is synchronized between the corresponding first local resource of the first site and the corresponding second local resource of the second site, wherein the corresponding first local resource and the corresponding second local resource are both configured to have the same resource identity, the first identity; and responsive to determining that content of the first stretched resource of the group is synchronized, transitioning the replication session to a synchronous state and transitioning the synchronous replication configuration for the group from the active-passive mode to the active-active mode wherein the first path is configured as active with respect to stretched resources of the group where the host issues I/Os directed to the stretched resources of the group over the first path, and wherein the second path is configured as active with respect to the stretched resources of the group where the host issues I/Os directed to the stretched resources of the group over the second path.

In at least one embodiment, subsequent to completing the first processing, processing can include: creating a first recovery snapshot of the group on the first site; and creating a second recovery snapshot of the first group on the second site.

In at least one embodiment, the change or modification operation of the group can include adding one or more stretched resources to the group.

In at least one embodiment, the change or modification operation of the group can include deleting or removing one or more of the existing stretched resources from the group.

In at least one embodiment, the change or modification operation of the group can include resizing a first of the one or more existing stretched resources of the group. Resizing the first existing stretched resource of the group includes expanding a current size of the first stretched resource to a second larger size, and wherein said expanding includes increasing an associated logical space of the first stretched resource from the current size to the second larger size. Resizing the first existing stretched resource of the group can include decreasing a current size of the first stretched resource to a second smaller size, and wherein said decreasing includes decreasing an associated logical address space of the first stretched resource from the current size to the second smaller size.

In at least one embodiment, the one or more existing stretched resources of the group can include one or more of: a volume, a logical device; a file; a file system; a sub-volume portion; a virtual volume used by a virtual machine; a portion of a virtual volume used by a virtual machine; and a portion of a file system.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7, 8 and 9 are flowcharts of processing steps that can be performed in at least one embodiment in accordance with the techniques of the present disclosure.

DETAILED DESCRIPTION OF EMBODIMENT(S)

Figure 1:
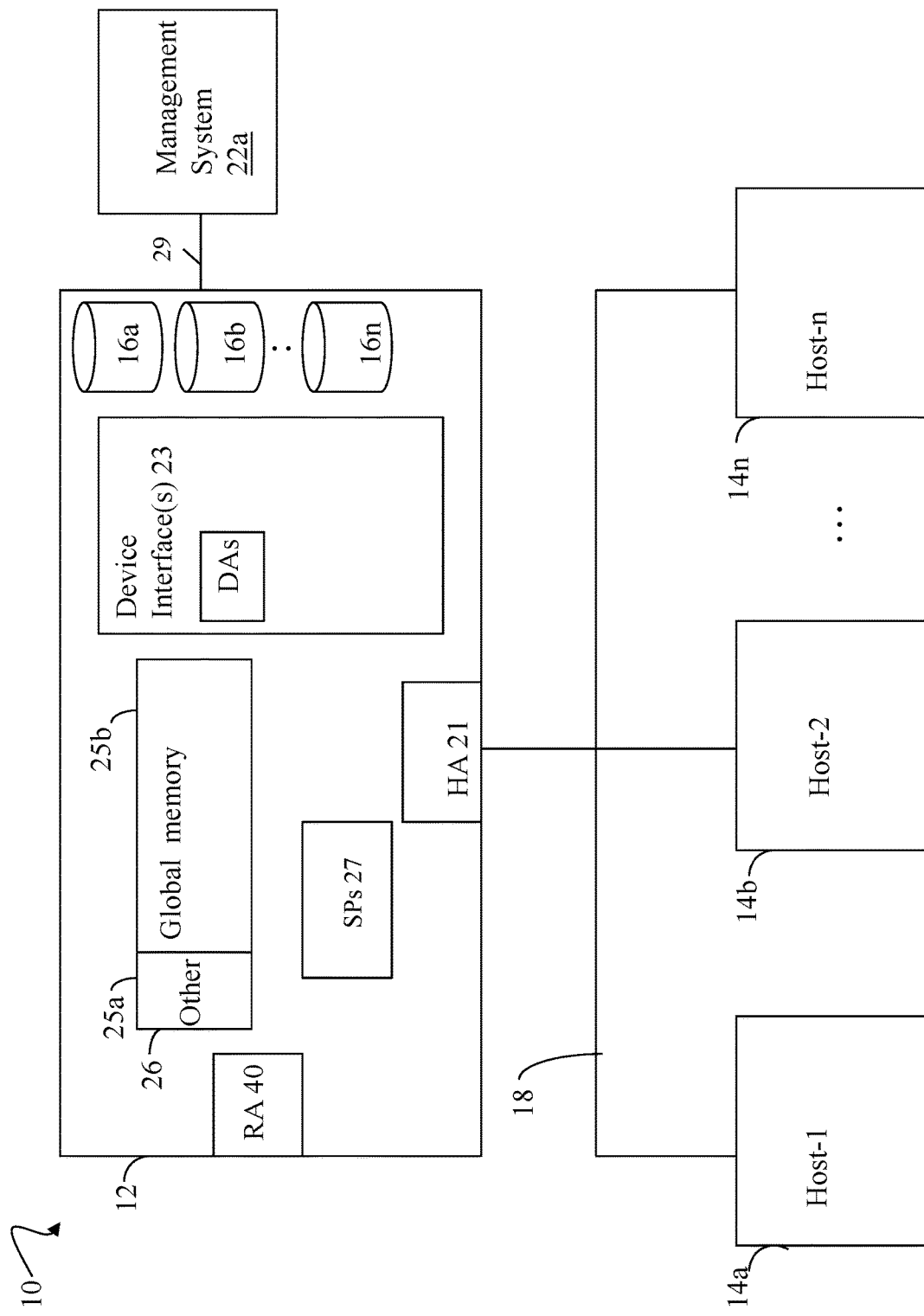
FIG. 1 is an example of components that can be included in a system in accordance with the techniques of the present disclosure.

Two data storage systems, sites or data centers, such as "site or system A" and "site or system B", can present a single data storage resource or object, such as a volume or logical device, to a client, such as a host. The volume can be configured as a stretched volume or resource where a first volume V1 on site A and a second volume on site B are both configured to have the same identity from the perspective of the external host. The stretched volume can be exposed over paths going to both sites A and B. In a metro replication configuration (sometimes simply referred to as a metro configuration), the host can issue writes to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

The stretched volume can provide data protection due to the synchronous mirroring of data maintained on V1 of site A and V2 of site B. For example, if site A experiences a disaster or is otherwise unavailable, the V2 copy of the stretched volume on site B can be used by the storage clients rather than have the storage clients undesirably experience data unavailability of the stretched volume. Alternatively, if site B experiences a disaster or is otherwise unavailable, the copy of the stretched volume V1 on site A can be used by the storage clients rather than have the storage clients undesirably experience data unavailability of the stretched volume. Thus, the various resources, including computing, networking and storage resources, on the two sites A and B can provide the needed redundancy for a user's application, such as an application executing on a host which reads data from and/writes data to the stretched volume.

Other uses of a stretched volume or LUN can include, for example, resource balancing across sites A and B; and storage migration such as migration of data from V1 of site A to V2 of site B, where V1 and V2 are configured as the same stretched LUN or volume.

A stretched volume or LUN can generally denote a single stretched storage resource or object configured from two local storage resources, objects or copies, respectively, on the two different storage systems A and B, where the local two storage resources are configured to have the same identity as presented to a host or other external client. Sometimes, a stretched volume or LUN can also be referred to herein as a metro volume or LUN. More generally, sometimes a stretched storage resource or object can be referred to herein as a metro storage object or resource.

A storage object group or resource group construct can also be utilized where the group can denote a logically defined grouping of one or more storage objects or resources. In particular, a stretched or metro volume group can denote a logically defined grouping of one or more stretched volumes or LUNs. More generally, a stretched or metro storage resource group or object group can denote a logically defined grouping of one or more stretched objects or resources.

An application executed on a host can use such group constructs to create consistent write-ordered snapshots across all volumes, storage resources or storage objects in the group. Applications that require disaster tolerance can use the metro configuration with a volume group to have higher availability. Consistent with other discussion herein, such a volume group of metro or stretched volumes can be referred to as a metro volume group. At a first point in time, a metro volume group GP1 can include multiple metro or stretched volumes. Subsequently at a second point in time, application requirements can change such that membership to the metro volume group GP1 can also accordingly change. For example, one or more new stretched LUNs or volumes can be added to GP1. As another example, one or more existing stretched LUNs or volumes of GP1 can be resized such as to grow or increase the associated storage capacity of such current metro volume group GP1 members. As another example, one or more existing stretched LUNs or volumes of GP1 can be removed from the metro volume group GP1. Thus, generally, changes with respect to GP1 at the second point in time can include any one or more of: GP1 membership changes and/or volume resizing changes. When a data storage system customer or user makes such changes as noted above, the modification to GP1 needs to be coordinated across both storage systems in a metro configuration.

At least one existing implementation requires pausing or temporarily stopping data replication across all members of GP1 to add a new stretched LUN or volume to GP1. For example while the new member is being added to GP1, one of the sites such as site A can remain active for the host to issue I/Os to the members of GP1 while the other site B remains inactive, such that the host does not issue I/Os, which are directed to members of GP1, to the site B. Subsequently, all members of GP1 can then be synchronized/resynchronized once the change such as adding a new member to GP1 is complete. The foregoing existing implementation is inefficient in that synchronization/resynchronization is required across all members of GP1. Thus, the foregoing existing implementation requires synchronization/resynchronization of both existing GP1 members as well as the one or more new members added to GP1.

Described in the following paragraphs are techniques of the present disclosure which overcome the foregoing disadvantages and provides for making a change to a metro volume group such as GP1 in a more efficient manner.

In at least one embodiment where the change to GP1 is adding a new LUN or volume, the techniques of the present disclosure require synchronization of only the newly added member of GP1 and does not require synchronization/resynchronization of existing members of GP1 (e.g., existing GP1 members as prior to the change adding the member to GP1). More generally, the techniques of the present disclosure can be used in connection with making a change or modification to GP1, where the change can be any one of a number of different specified changes or modifications. In at least one embodiment, the change can include any one or more of: adding a new member, such as adding a new stretched LUN or volume, to GP1; removing an existing member, such as an removing an existing stretched LUN or volume, from GP1; and resizing an existing member, such as resizing an existing stretched volume or LUN of GP1 to increase the associated volume or LUN's storage capacity.

In at least one embodiment, the techniques of the present disclosure require synchronization of only the one or more members, resources or storage objects of GP1 affected by the change or modification. For example in at least one embodiment, for a stretched LUN or volume added to GP1, only the added stretched LUN or volume is synchronized. As another example, for an existing stretched LUN or volume of GP1 which has its associated storage capacity expanded, only the existing stretched LUN or volume having its storage capacity expanded is synchronized.

In at least one embodiment in accordance with the techniques of the present disclosure, the workflow can generally be structured into three phases: preparing the metro volume group, committing the change or modification to the metro volume group, and performing any needed background synchronization of the one or more impacted LUNs or volumes related to the committed change or modification.

The techniques of the present disclosure can be used in connection with metro configurations implemented in accordance with any suitable standard or protocol. For example, in at least one embodiment, the techniques of the present disclosure can be implemented in accordance with the SCSI standard, the NVMe-oF (Non-Volatile Memory Express over Fabrics) standard, as well as any other suitable standard or protocol. In at least one embodiment, the change to a metro volume group can including adding a new stretched volume to an existing metro volume group where the new stretched volume added originates from an existing local volume on a single one of the sites A or B. Adding the new stretched volume includes configuring the existing local volume as a new stretched volume on both sites A and B, and adding the new stretched volume to the existing metro volume group.

In at least one embodiment, a metro group (also sometimes referred to as a metro storage resource or object group) can also be generally referred to as a group of stretched storage resources or objects.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
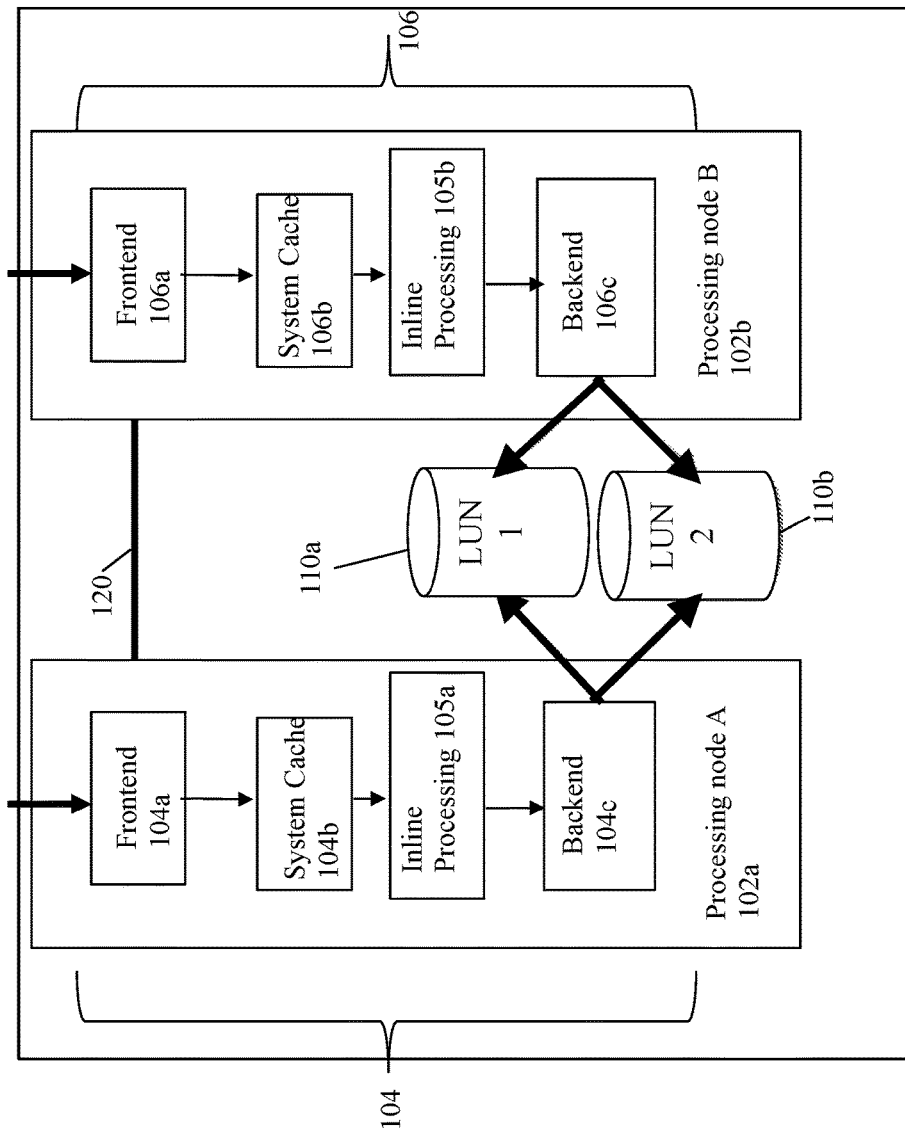
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
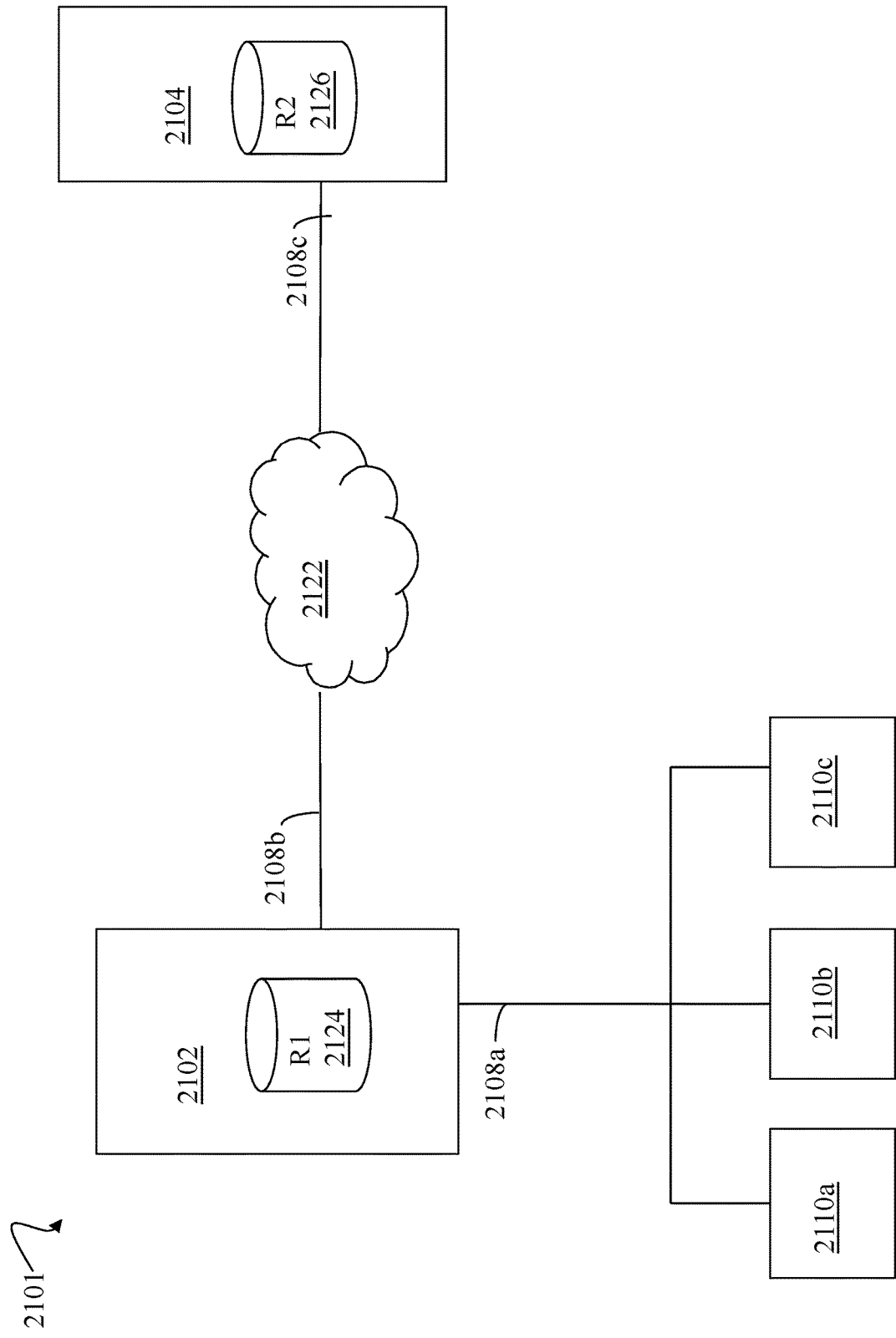
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110a can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
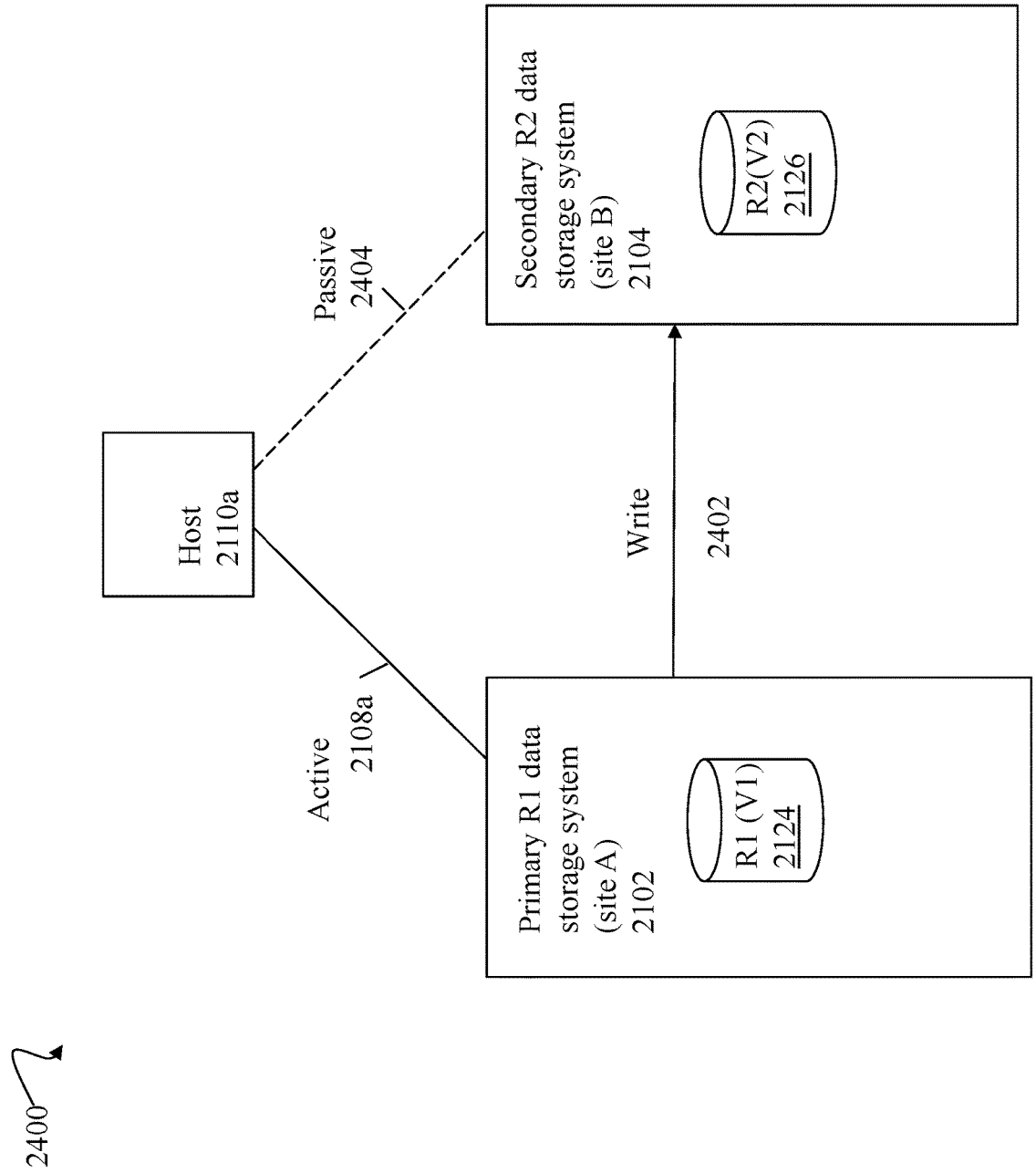
FIG. 4 is an example illustrating an active-passive replication configuration of a stretched volume using one-way synchronous replication in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be synchronously replicated to the R2 system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
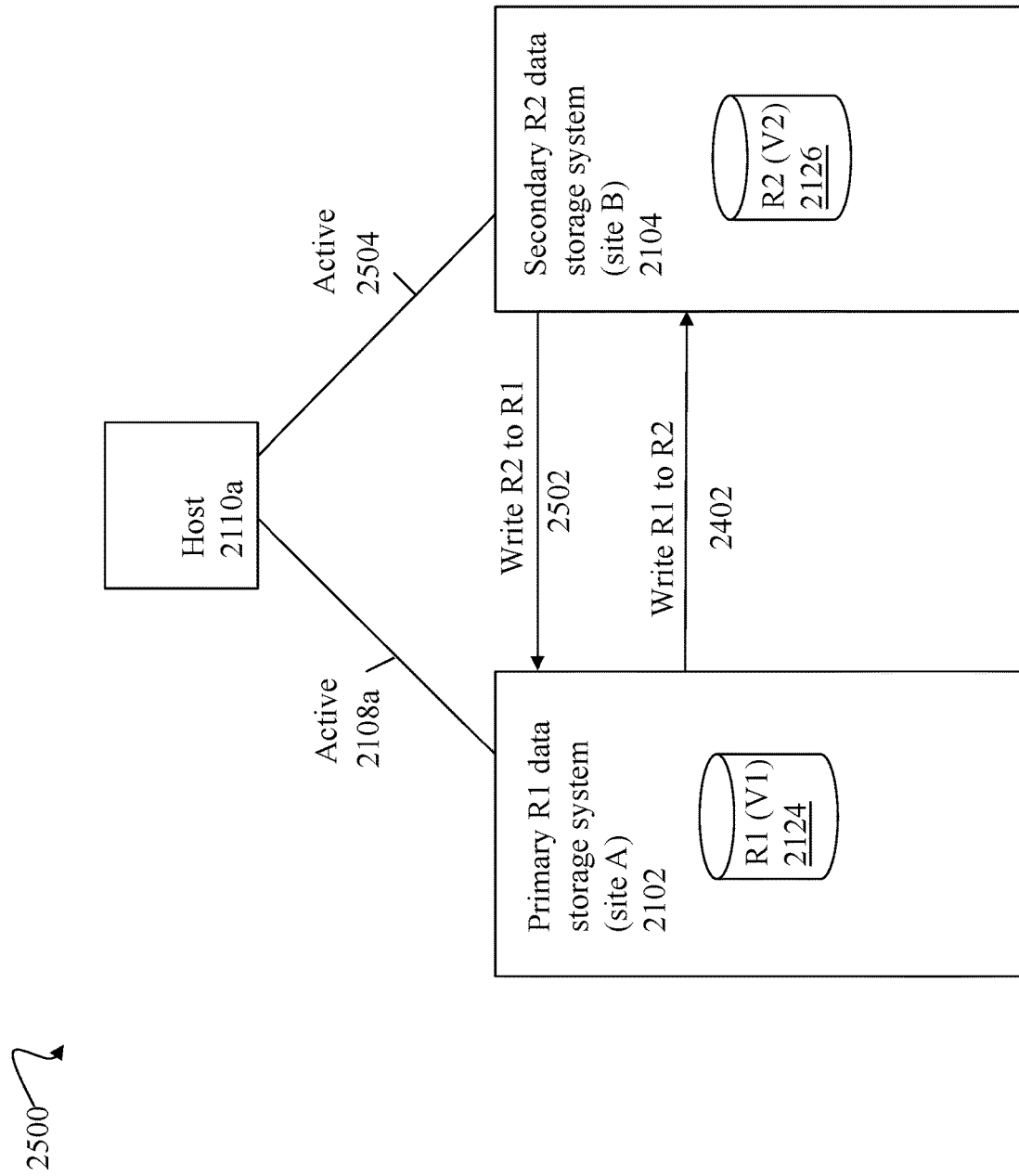
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time.

In at least one embodiment as discussed in more detail below, in a replication configuration of FIG. 5 with an active-active configuration where writes can be received by both systems or sites 2124 and 2126, a predetermined or designated one of the systems or sites 2124 and 2126 can be assigned as the preferred system or site, with the other remaining system or site assigned as the non-preferred system or site. In such an embodiment with a configuration as in FIG. 5, assume for purposes of illustration that system or site R1/A is preferred and the system or site R2/B is the non-preferred.

The host 2110a can send a first write over the path 2108a which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110*a* over the path 2108*a*, where the acknowledgement indicates to the host that the first write has completed.

The first write request can be directly received by the preferred system or site R1 2102 from the host 2110*a* as noted above. Alternatively in a configuration of FIG. 5 in at least one embodiment, a write request, such as the second write request discussed below, can be initially received by the non-preferred system or site R2 2104 and then forwarded to the preferred system or site 2102 for servicing. In this manner in at least one embodiment, the preferred system or site R1 2102 can always commit the write locally before the same write is committed by the non-preferred system or site R2 2104. In particular, the host 2110*a* can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110*a* over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110*a*, the same stretched LUN A is exposed over the two active paths 2504 and 2108*a*.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108*a* to the system 2102 is stored on the R1 device 2124 and also transmitted to the system 2104 over 2402. The write sent over 2402 to system 2104 is stored on the R2 device 2126. Such replication is performed synchronously in that the received host write sent over 2108*a* to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110*a* by having each volume or device of the device pair (R1 device 2124, R2 device 2126) configured and presented to the host 2110*a* as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration. In the following paragraphs, sometimes the configuration of FIG. 4 can be referred to as a synchronous (sync) configuration, synchronous (sync) replication configuration, or a one-way synchronous (sync) replication configuration. The configurations of FIGS. 4 and 5 include two data storage systems or data centers 2102 and 2104 which can more generally be referred to as sites. In the following paragraphs, the two systems, data centers or sites 2102 and 2104 can be referred to respectively as site A and site B.

Referring to FIG. 4 with the one way synchronous replication configuration with respect to the stretched volume or LUN A (e.g., more generally a stretched storage object or resource), the system or site A 2102 can sometimes be referred to as the sync active site with respect to the stretched volume or LUN due to the active path state 2108*a*, and the system or site B 2104 can sometimes be referred to as the sync passive site with respect to the stretched volume or LUN due the passive path state 2404.

Referring to FIG. 5 with the metro replication configuration, both systems or sites A 2102 and B 2104 are active with respect to the stretched volume or LUN due to the active path states 2108*a* and 2504. In at least one embodiment with a metro replication configuration, an active path with respect to a LUN or volume on a system or site can be further characterized as preferred or non-preferred. Thus, for example, the active paths 2108*a* and 2504 with respect to the stretched volume or LUN can be further characterized as preferred or non-preferred as discussed below in more detail.

In at least one embodiment, the sync replication configuration of FIG. 4 can actually be configured with two-way synchronous replication for the stretched LUN A (as in FIG. 5) rather than one-way synchronous replication. However, as in FIG. 4, the path 2108*a* can still be configured as active and the path 2404 can still be configured as passive. Thus, the host 2110*a* can still only have access to the content of the stretched LUN A over one or more active paths 2108*a* to the sync active site 2102 and can still have no access to the content of the stretched LUN A over one or more passive paths 2404 to the sync passive site 2104. Thus, in some embodiments, two-way synchronous replication for the stretched LUN A can actually be established or configured in the arrangement of FIG. 4 but effectively only one-way synchronous replication from the sync active site 2102 to the sync passive site 2104 is utilized. Put another way, effectively only one-way synchronous replication (from the sync active site 2102 to the sync passive site 2104) for the stretched LUN A can actually be utilized at any point in time since I/Os that are directed to the stretched LUN A and that are sent over the passive path 2404 to the sync passive site 2104 are not actually serviced (e.g., hence no synchronous replication is actually performed from the sync passive site 2104 to the sync active site 2102). Should the status of path 2108*a* transition to passive and the status of path 2404 transition to active, site 2102 transitions to the sync active role and site 2104 transitions to the sync passive role with one-way replication from the current sync active site 2104 to the current sync passive site 2102.

In an embodiment described herein, the systems or sites 2102 and 2104 can be a SCSI-based system such as SCSI-based data storage array, data center, or appliance. An embodiment in accordance with the techniques herein can include hosts and data storage systems, centers or sites which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a volume or LUN's access state with respect to a particular initiator port and the target port. Thus, in accordance with the ALUA standard, various access states may be associated with a path with respect to a particular device, such as a LUN or volume. In particular, the ALUA standard defines such access states including the active-optimized, active-non optimized, unavailable, and other states. The ALUA standard also defines other access states. A recognized path (such as recognized by a host as a result of discovery processing) over which I/Os (e.g., read and write I/Os) can be issued to access data of a LUN can have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a "preferred" path state for the particular LUN. A path for a particular LUN having the active-non optimized (or unoptimized) path state may also be referred to herein as a non-optimized or "non-preferred" path for the particular LUN. Thus active-non-optimized denotes a "non-preferred" path state with respect to the particular LUN. Generally, I/Os directed to a LUN that are sent by the host to the data storage system over active-optimized and active-non optimized paths are processed or serviced by the data storage system. However, the host may select to send I/Os to a LUN from those preferred paths having an active-optimized state for the LUN. The host may proceed to use a non-preferred path having an active-unoptimized state for the LUN only if there is no preferred or no active-optimized path for the LUN. In this manner, setting a path to active-optimized with respect to a particular LUN can result in hosts using such active-optimized paths over any existing active non-optimized paths to the same LUN. Should there be no active-optimized path availability for the LUN, the host can then utilize an existing active non-optimized path to the LUN. It should be noted that the unavailable ALUA path state is described in more detail elsewhere herein.

Referring again to FIG. 5 in at least one embodiment, the active path 2108*a* to the system or site A 2102 can be a preferred path for the stretched volume or LUN, where the system or site A 2102 can be sometimes referred to as a metro preferred site. In at least one embodiment with reference to FIG. 5, the active path 2504 to the system or site B 2104 can be a non-preferred path for the stretched volume or LUN, where the system or site B 2104 can be sometimes referred to as a metro non-preferred site.

Although examples in the following paragraphs refer to a stretched volume or LUN, more generally, the techniques of the present disclosure can be generalized for use with a stretched object or resource which can be a volume or LUN, a file system, a virtual volume or vvol used in connection with virtual machines, and any other suitable storage resource or object. The stretched volume or LUN, LUN A, can be configured from a volume pair (V1, V2), where V1 is in site A and V2 is in site B, where V1 and V2 are both configured as the same logical volume or LUN A, where V1 and V2 both have the same identity as presented, viewed or exposed to an external host.

Discussion and examples of the following paragraphs with respect to the specific stretched volume LUN A assume that site A is the preferred site for metro replication (e.g., FIG. 5) and that site B is the non-preferred site for metro replication. Generally, the techniques of the present disclosure can be used in configurations of metro replication as in FIG. 5. In at least one embodiment, writes from hosts directed to a stretched volume can be committed to site A, the metro preferred site first and then committed to the metro non-preferred site B.

In some cases, a stretched volume such as LUN A can also be referred to herein as a metro volume configured in a metro configuration or metro replication configuration as in FIG. 5 with bi-directional or two-way synchronous replication as discussed above.

Metro volume groups can be used to maintain and preserve write consistency and dependency across all stretched or metro LUNs or volumes which are members of the metro volume group. Thus, write consistency can be maintained across, and with respect to, all stretched LUNs (or more generally all resources or objects) of the metro volume group whereby, for example, all members of the metro volume group denote copies of data with respect to a same point in time. In at least one embodiment, a snapshot can be taken of a metro volume group at a particular point in time, where the group-level snapshot includes snapshots of all LUNs or volumes of the metro volume group across both sites or systems A and B where such snapshots of all LUNs or volumes are write order consistent. Thus such a metro volume group level snapshot of a metro volume group GP1 can denote a crash consistent and write order consistent copy of the stretched LUNs or volumes which are members of the metro volume group GP1. To further illustrate, a first write W1 can write to a first stretched volume or LUN 10 of GP1 at a first point in time. Subsequently at a second point in time, a second write W2 can write to a second stretched volume or LUN 11 of GP1 at the second point in time. A metro volume group snapshot of GP1 taken at a third point in time immediately after completing the second write W2 at the second point in time can include both W1 and W2 to maintain and preserve the write order dependency as between W1 and W2. For example, the metro volume group snapshot of GP1 at the third point in time would not include W2 without also including W1 since this would violate the write order consistency of the metro volume group. Thus, to maintain write consistency of the metro volume group, a snapshot is taken at the same point in time across all volumes, LUNs or other resources or objects of the metro volume group to keep the point-in-time image write order consistent for the entire group.

Consistent with other discussion herein, replication failure can be caused by three major classes of faults or failures. In a metro configuration for purposes of illustration and discussion in the following paragraphs, assume that site A is configured as the preferred site and that site B is configured as the non-preferred site. The following denotes how the different classes of faults or failures can be typically handled from an application and user perspective. Differences or modification to those typical notes below are discussed in more detail in subsequent paragraphs:

1. Loss of storage system or appliance in site A: Site A can be the preferred site for a metro replication configuration. Typically, on loss of the storage system or appliance on site A and without witness deployment, an explicit action by the user can be performed in at least one embodiment to set site B to the metro preferred site. If a witness is deployed, the witness can facilitate ensuring that site B is promoted to the metro preferred site such that host access to site B provides high availability. When site A subsequently becomes available and comes online so as to be in a normal healthy working state, the contents or data of V2 of site B needs to be resynchronized with the contents or data of V1 of site A. Generally, a witness can be another system or component in communication with sites A and B as part of the replication configuration. The witness can facilitate decision-making such as for promotion of site B to the metro preferred site.

2. Loss of storage appliance in site B: Since site A is already designated as the preferred metro site for metro replication site, site A can continue its role as the metro preferred site. When site B recovers and comes online, contents or data of V1 of site A needs to be resynchronized the data or contents of V2 of site B.

3. Loss of networking or replication link between site A and site B: Since site A is already designated as the preferred metro site for metro replication, site A can continue its role as the metro preferred site. When the networking or replication link recovers, contents or data of V1 of site A needs to be resynchronized with the data or contents of V2 of site B. In a metro configuration with a witness, the replication link can fail but both sites A and B can be available and online and both sites A and B can communicate with the witness. To avoid data inconsistency between sites A and B in an active-active metro configuration, the witness can facilitate communications between sites A and B to allow site A to continue receiving and servicing I/Os of the stretched LUN A thus continue as the metro preferred site. The witness can also instruct site B to become unavailable and not service I/Os directed to the stretched LUN A until the replication link recovers or is restored to a healthy state for use in replication between sites A and B.

Described in the following paragraphs is a three phase workflow that can be performed to apply or implement a change, modification or update to a metro volume group. For purposes of illustration, the change described in the following paragraphs can be adding a new member to a metro volume group GP1.

The volume or LUN to be added to the metro volume group GP1 can be a regular non-stretched volume or LUN configured as a single local volume or LUN on one of the two sites A or B. The volume or LUN being added can be a local volume or LUN 10 on one of the two sites, such as configured on site A. The LUN 10 can have existing data or content stored thereon prior to commencing execution of the workflow of the techniques of the present disclosure.

The local LUN 10 can be configured on site A which is also designated as the preferred site or system and where the site or system B is designated as the non-preferred site or system. Generally, the LUN or other resource being added to the existing metro group as a new metro or stretched resource can be configured on the preferred site. In at least one embodiment, the role of preferred and non-preferred as between the sites A and B of the metro configuration can be configurable such as by a user.

For purposes of illustration of the techniques of the present disclosure in the following paragraphs, assume that there is an existing metro volume group GP1 including one or more existing stretched or metro volumes as members. Assume further that the above-noted local LUN 10 configured only on site A is being added to GP1 using the techniques of the present disclosure as described in the workflow of the following paragraphs. In one aspect, the existing local volume or LUN 10, V1, on site A can be converted to a stretched volume or LUN 10 added to GP1 where the stretched volume or LUN 10 can be configured from V1 on site A having a counterpart remote volume V2 on site B, where V1 and V1 are configured to have the same identity, as volume or LUN 10, when presented to the host over paths from both sites A and B.

Described in the following paragraphs are techniques of the present disclosure in connection with the three phase workflow performed in connection with a change made with respect to a metro volume group, or more generally, a metro object or resource group. The three phase workflow is described in the following paragraphs with respect to the particular metro volume group change of adding a new stretched LUN of volume to an existing metro volume group GP1. However, more generally, the workflow can be used in connection with any suitable group change operation or modification.

In at least one embodiment, the three phase workflow can include the following phases: a first phase 1, the preparation phase; a second phase 2, the commitment phase; and a third phase 3, the synchronization phase where the content of the new metro volume group member is synchronized across sites A and B. The foregoing three phases are described in more detail in the following paragraphs.

Generally, in the preparation phase, processing can include placing the metro configuration with respect to GP1 in bias mode, ensuring the preferred site or system includes the local V1 volume or LUN being added, and switching the metro volume group into active-passive mode. The preparation phase can include transitioning the metro configuration for GP1 from the active-active mode or state as in FIG. 5 to the active-passive mode as in FIG. 4 with the difference that the existing metro volume group members of GP1 can remain configured for bi-directional synchronous replication. In this case with reference to FIG. 5, the path 2504 between the host and the non-preferred site B transitions from an active state to a passive state whereby I/Os (directed to any volume of the metro volume group GP1) issued by the host over the passive path to the non-preferred site B are not serviced. In this manner, the host can be unable to issue I/Os, which are directed to the metro volume group GP1, to the non-preferred site B. Put another way, the foregoing passive path state between the host and non-preferred site B can restrict host access to GP1 such that no host I/Os directed to GP1 members are serviced through the non-preferred site B.

In some embodiments as discussed herein, a witness can be used in connection with implementations to decide a winner denoting which of the systems or sites A and B continues servicing I/Os directed to the metro volume group if there is a replication failure or fracture with respect to the metro volume group GP1. In such an embodiment in which a witness is deployed such that the replication configuration is operating in a witness mode, the preparation phase can include removing, disconnecting or disengaging the sites A and B from the witness so that the witness is no longer used in connection with deciding a winner among sites A and B, where the winner is the single site that continues servicing I/Os of the metro volume group in the event of a replication failure or fracture with respect to the metro volume group GP1. As a result of removing, disconnecting or disengaging the witness, the metro configuration can now transition from the witness mode to bias mode. In at least one embodiment, if there is no witness deployed in connection with the metro configuration of sites A and B, the metro configuration can already be in bias mode. Consistent with other discussion herein, in bias mode, sites A and B can each be configured such that a first of the sites such as site A is designated as the preferred site with the second remaining site such as site B designates as the non-preferred site. Each of the sites can be configured to know its role as well as the role of the other site of the metro configuration. Responsive to a replication link failure or failure of the non-preferred site B, the preferred site A can be the single site which continues to service I/Os directed to the metro volume group G When in bias mode and responsive to a replication failure or fracture of the metro volume group GP1, the winner or surviving site which continues servicing I/Os of GP1 in the event of replication failure or fracture with respect to GP1 can be predetermined whereby the sites A and B can independently determine which one of the sites is the winner. In at least one embodiment of the bias mode and responsive to a replication failure or fracture with respect to the metro volume group GP1, the particular one of the sites A and B configured as the preferred site can always win and continue servicing I/Os directed to the stretched volumes of the metro volume group GP1. In at least one embodiment with bias mode, only the preferred site can win or survive. If the replication failure or fracture is caused by the preferred site A failing, whereby only the non-preferred site B remains online, the workflow in accordance with the techniques of the present disclosure can stop or fail. For example, non-preferred site B can detect that preferred site A is offline or unavailable whereby the non-preferred site B does not subsequently service I/Os directed to volumes of the metro volume group GP1. Thus with bias mode in at least one embodiment, the winner or remaining site which continues servicing I/Os with respect to members of the metro volume group GP1 can always be the single designated preferred site, such as site A. In at least one embodiment, in a scenario where the preferred site fails or is not online and accessible to the host, an embodiment can declare no winner and thus no surviving site remains to service I/Os directed to the metro volume group GP1.

Figure 6:
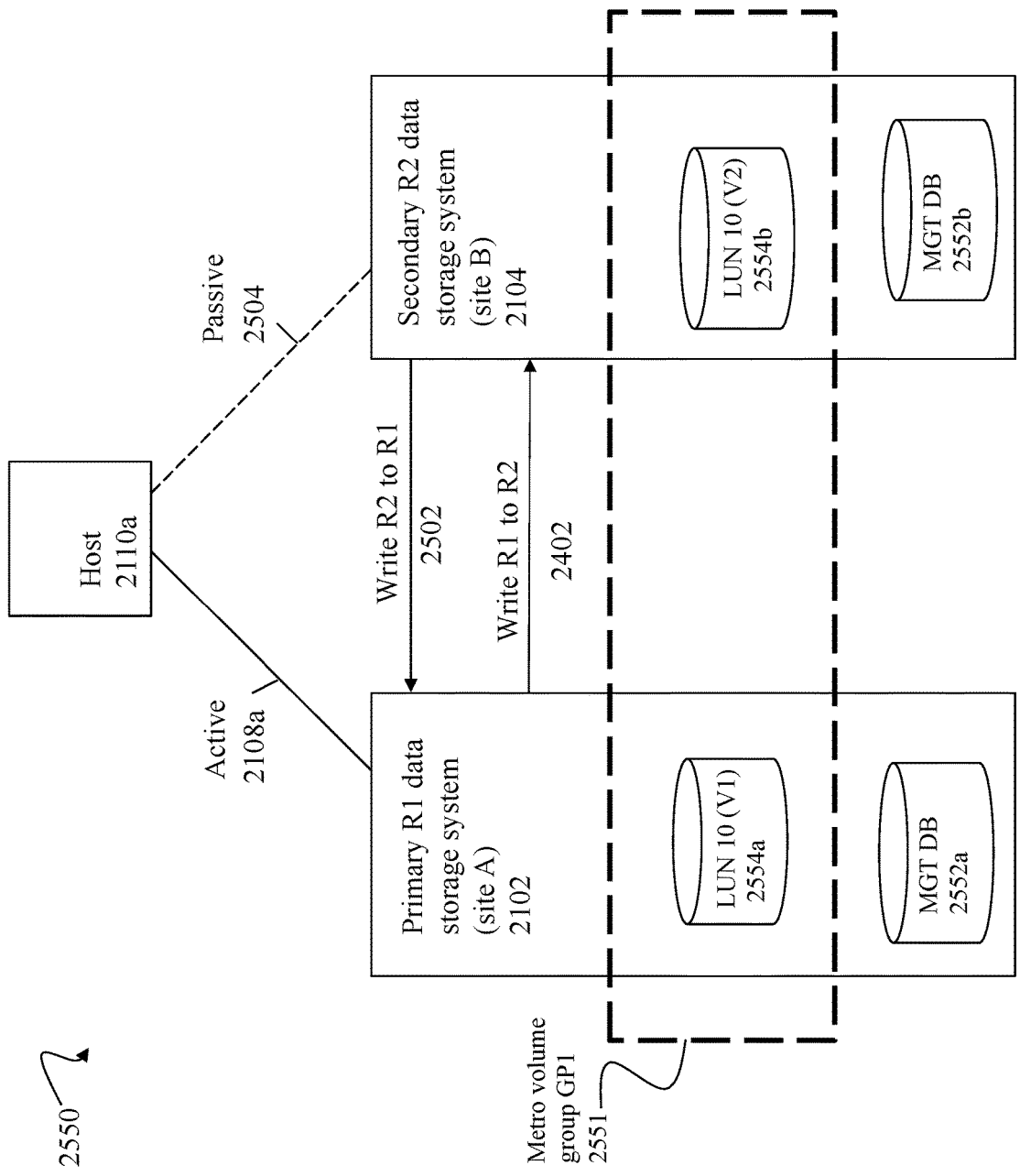
FIG. 6 is an example illustrating an active-passive replication configuration of a stretched volume using two-way or bidirectional synchronous replication in at least one embodiment in accordance with the techniques of the present disclosure.

In the preparation phase, processing can also be performed to transition or switch the metro configuration for the metro volume group GP1 from the active-active mode or state (as in FIG. 5) to an active-passive mode or state, as in FIG. 6, with respect to the existing metro volume group members of GP1 2551. In this embodiment as in FIG. 6, bi-directional synchronous replication can remain configured, enabled and/or established for the existing members (e.g., existing metro or stretched volumes) of the metro volume group GP1. However, in the active-passive mode with reference to the metro configuration of FIG. 6, the path 2504 between the host 2110*a* and the non-preferred site B 2104 transitions from an active state (as in FIG. 5) to a passive state (as in FIG. 6). In the active-passive mode or state of the metro configuration of FIG. 6, I/Os, which are directed to any volume of the metro volume group GP1 2551 and issued by the host 2110*a* over the passive path 2504 to the non-preferred site B 2104, are not serviced. In this manner, the host 2110*a* can be unable to issue I/Os, which are directed to the metro volume group GP1, to the non-preferred site B 2104. Also in this manner, the host can only be able to issue I/Os directed to the metro volume group GP1 to the preferred site A 2102, such as over the active path 2108*a*. It should be noted that for simplicity, GP1 2551 is illustrated in FIG. 6 as only including a single stretched volume or LUN 10 configured from local volumes 2554*a-b*, where the stretched LUN 10 is being added as a new member to GP1 2551 in connection with an example described below in subsequent paragraphs. Generally, GP1 2551 can include one or more existing stretched volumes or LUNs (not illustrated) prior to adding the stretched LUN 10 as a new member to GP1 2551 as discussed below.

In at least one embodiment in accordance with the techniques of the present disclosure operating in accordance with the ALUA standard, the path 2504 can transition from the active state (such as ALUA's active/optimized or active non-optimized state) to the unavailable state with respect to all existing member stretched LUNs or volumes of the metro volume group GP1 as exposed over the path 2504 from the site B 2104 to the host 2110*a*. In connection with the unavailable state of the path 2504 in at least one embodiment, the stretched volumes or LUNs of the metro volume group GP1 can be visible or exposed to the host over the path 2504. However, the host is not allowed to issue I/Os to such stretched LUNs of the metro volume groups over the path 2504 configured as unavailable. In this manner, the ALUA path state of unavailable can denote the more general passive state of the path 2504 as illustrated in FIG. 6. In at least one embodiment, the ALUA path state of unavailable with respect to the particular path 2504 and the particular stretched volumes or LUNs of the metro volume group GP1 means that the stretched volumes or LUNs exposed over the path 2504 to the host 2110*a* can be discoverable but yet the host cannot issue I/Os to such stretched volumes or LUNs exposed over the path 2504 to the host 2110a. For example, in at least one embodiment in accordance with the SCSI standard, the host 2110a can issue a limited set of non-I/O commands or requests, such as a report LUNs command and a report target port groups command, over the path 2504 to the metro volume group GP1 members when in either the unavailable state or the active state (active optimized and/or active non-optimized). However in such an embodiment, the host 2110a cannot issue I/Os over the path 2504 to the metro volume group GP1 members when in the path 2504 is in the unavailable state.

In at least one embodiment, the particular path state or mode used to denote the more general passive state or mode of the path 2504 with respect to the metro volume group GP1 members as in FIG. 6 can be implemented in any suitable manner that can vary with the standard and protocol used in the embodiment. As another example in at least one embodiment operating in accordance with the NVMe standard (rather than the SCSI standard), the ANA (Asymmetric Namespace Access) standard (rather than ALUA) and the ANA's associated path states or modes can be utilized. For example, in at least one such embodiment, the ANA state or mode of inaccessible can be used to denote the passive state of path 2504 whereby the host can be unable to issue I/Os which are directed to metro volume group GP1 members over the path 2504 when the path 2504 is configured as inaccessible with respect to such metro volume group GP1 members (which are exposed over the path 2504 by the site B 2104 to the host 2110a). In this manner, the ANA path state of inaccessible can be implemented and used to denote the more general passive state of the path 2504 as in the metro configuration of FIG. 6.

In at least one embodiment, transitioning the path 2504 to the non-preferred site B 2104 with respect to those stretched or metro volumes of the metro volume group GP1 can be desired to avoid the possibility of the host 2110a reading inconsistent data from the two sites A and B. Thus, transitioning the path 2504 to passive can be performed to restrict host access to the members of GP1 through the non-preferred site B 2104.

In this manner after completing the preparation phase and with reference to FIG. 6, the host 2110a can issue I/Os to existing members (e.g., existing metro or stretched volumes) of GP1 2551 over the active path 2108a at site A 2102 but cannot issue I/Os to existing members of GP1 2551 over the passive path 2504 at site B 2104. If writes are made to existing members of GP1 over the active path 2108a at site A, such writes can be: applied to existing local V1 volumes of site A; and also replicated and applied to corresponding local V2 volumes of site B.

Following the first phase 1, the preparation phase, processing can be performed for a second phase 2, a commitment phase. In the commitment phase, the sites A and B commit to adding the existing local volume, LUN 10 in this example, to the metro volume group GP1 as a new stretched volume. Assume that the new stretched volume being added to GP1 is LUN 10 with a local volume V1 2554a configured as LUN 10 on site A and a local volume V2 2554b configured as the remote counterpart LUN 10 on site B.

In at least one embodiment, the commitment phase can include updating data structures defining the metro volume group GP1 in the management database (MGT DB) 2552a of site A 2102 and updating data structures defining the metro volume group GP1 in the MGT DB 2552b of site B 2104. The commitment phase can include updating MGT DB 2552a of site A 2102 to include V1 (2554a) configured as the stretched LUN 10 with a counterpart V2 (2554b) configured as stretched LUN 10 on site B; and including updating the metro volume group membership of GP1 to now also include the stretched LUN 10. In a similar manner, the commitment phase can include updating MGT DB 2552b of the site B 2104 to include local volume V2 (2554b) configured as the stretched LUN 10 with a remote counterpart V1 (2554a) configured as stretched LUN 10 on site A; and including updating the metro group membership of GP1 to now also include the stretched LUN 10.

In at least one embodiment, after completing the commitment phase, V1 2554a configured as the stretched LUN 10 can be exposed (e.g., visible or discoverable) to the host 2110a over the active path 2108a at site A 2102, and V2 2554b configured as the stretched LUN 10 can be exposed (e.g., visible or discoverable) to the host 2110a over the passive path 2504 to the host 2110a. However, at this point after completing the commitment phase, the host 2110a can only issue I/Os directed to V1 2554a configured as the stretched LUN 10 at site A over the active path 2108a; and the host cannot issue I/Os directed to V2 2554b configured as the stretched LUN 10 at site B. Also at this point after completion of the commitment phase in at least one embodiment, replication between V1 2554a and V2 2554b (both configured as the same LUN 10) has not yet been enabled and established. In at least one embodiment, V2 2554b (configured as LUN 10) can be unavailable to the host 2110a such that V2 2554b can be discoverable or exposed to the host as LUN 10 over the passive path 2504. However, the host cannot issue I/Os to V2 2554b over the path 2504. In an embodiment in accordance with the SCSI standard, the path 2504 can be having the unavailable ALUA path state described herein with respect to V2 2554b.

In one aspect, the commitment phase can be characterized as updating the necessary management constructs of the MGT DBs 2552a-2552b. However in at least one embodiment, there may not have yet been any changes to the data path components to enable or establish the synchronization, and mirroring or data replication between the newly added member stretched LUN 10 (configured from V1 2554a and V2 2554b).

Following the second phase 2, the commitment phase, processing can be performed for a third phase 3, a synchronization phase. The synchronization phase can include performing background synchronization for the new member, the new stretched LUN 10, added to GP1. The synchronization phase can include configuring appropriate data path components to enable or establish the mirroring or data replication between the newly added member stretched LUN 10 (configured from V1 2554a and V2 2554b), and to also synchronize the content of V2 2554b with the content of V1 2554a. Thus, the synchronization phase for the new member, or more generally, for the changed or modified member, can include configuring, enabling and establishing the appropriate data path components to implement the change or modification represented by the MGT DB change(s) made in the commitment phase.

The commitment phase can include a step S3a where an existing replication session state associated with the metro volume group GP1 transitions to a "synchronization in progress" state. In this state in the step S3a, data mirroring or bi-directional data replication is enabled and established for the existing one or more members of GP1 but not for the newly added stretched LUN 10. Thus as a whole the metro volume group GP1, which is defined as including any existing members as well as the newly added stretched LUN 10, can be crash consistent on the preferred site A but not crash consistent on the non-preferred site B. When the metro volume group GP1 has a replication session state of "synchronization in progress" denoting that the newly added stretched LUN 10 has not yet been synchronized and that bi-directional or two-way synchronous replication is not yet established for stretched LUN 10, one or more existing recovery snapshots of GP1 as prior to adding the new stretched LUN 10 can be preserved. Such existing recovery snapshots of GP1 as prior to making the membership change can be used as may be needed for recovery purposes since such snapshots with respect to GP1 membership as prior to the change or modification (e.g., prior to the preparation phase) can denote a crash consistent copy of GP1 on both the site A and site B.

Following the step S3a is a step S3b of the synchronization phase. In the step S3b, a metro synchronization processing workflow is performed for the newly added stretched LUN 10. In at least one embodiment, the step S3b can include establishing or enabling bi-directional or two-way synchronous replication for the newly added stretched LUN 10. In particular the step S3b can include enabling and establishing synchronous replication of writes from V1 2554a to V2 255b; and can also include enabling and establishing synchronous replication of write from V2 2554b to V1 2554a. The step S3b can include synchronizing the content of V1 2554a and V2 2554b. In this example, V1 2554a can be an existing local volume which contains content that existed prior to commencing the three phase workflow described herein (e.g., prior to commencing with the preparation phase or the first phase 1). In this case, the step S3b can include copying content of V1 2554a to V2 2554b to synchronize the two local volumes 2554a-b such that they mirror each other in terms of content. The step S3b can include enabling and establishing the appropriate data path components on both the sites A 2102 and B 2104 for the bi-directional or two-way synchronous replication between V1 2554a and V2 2554b. The step S3b can include then using the established data path components to synchronize the content of V1 2554a and V2 2554b where content from V1 2554a is copied and applied to V2 2554b.

Following the step S3b of the synchronization phase is a step S3c of the synchronization phase. In the step S3c, once the newly added member, stretched LUN 10, of GP1 is in a "mirror synchronous state" where the contents of V1 2554a and V2 2554b are synchronized, the metro volume group GP1 replication session state can transition from the "synchronization in progress" state (as set in the step 3a) to a synchronized state whereby the newly added stretched LUN 10 can become available through both site A (e.g., as V1 2554a) and site B (e.g., as V2 2554b). The step S3b can include transitioning the state of the metro configuration of FIG. 6 from its active-passive state with respect to the members of GP1 to an active-active state whereby the metro configuration can be as in FIG. 6 with the difference that the path 2504 transitions from passive to active. Thus, the site B 2104 can become available to service I/Os directed to members of GP1. In this manner after completing the step S3b in at least one embodiment, all members of GP1, including the newly added stretched LUN 10 (e.g., configured from V1 2554a and V2 2554b), are exposed over the path active 2108a from site A, and also now exposed over the active path 2504 from site B. In at least one embodiment in accordance with the SCSI standard using ALUA, the step S3b can include updating the state of path 2504 to active-optimized with respect to members of GP1. In some embodiments, there can be multiple paths between a site and a host. In this case, the step S3b can include updating at least one such path between the host 2110a and site B 2104 to active-optimized and remaining path between the host 2110a and the cite B 2104 to active non-optimized.

Following the step S3c of the synchronization phase is a step S3d of the synchronization phase. In the step S3d, processing can be performed to create a recovery snapshot of the metro volume group GP1 on both sites A and B. The step S3d can include creating or taking a first recovery snapshot of GP1 on site A and creating or taking a second recovery snapshot of GP1 on site B. Creating the first recovery snapshot of GP1 on site A can include taking write-consistent snapshots across all local V1 volumes of GP1 on site A. Creating the second recovery snapshot of GP1 on site B can include taking write-consistent snapshots across all local V2 volumes of GP1 on site B. In at least one embodiment, the recovery snapshots of GP1 on both sites A and B can be identical. In at least one embodiment, taking a snapshot of GP1 on a site includes taking snapshots of all members of GP1, including the newly added stretched LUN 10, where such snapshots are write consistent and thus where all such snapshots of members of GP1 denote a crash consistent copy of GP1. Thus a crash-consistent snapshot of GP1 on a site, such as site A, takes a snapshot of members (e.g., local V1s) of GP1 while preserving the write order of writes made to such members of GP1. In the event of a subsequent crash or failure of one of the sites A or B, the surviving functional site can continue to service I/Os directed to members of the metro volume group GP1. Subsequently, when the failed site recovers, the recovery snapshots of GP1 can be leveraged to resynchronize the copy of the metro volume group GP1 of the recovered site.

To further illustrate use of recovery snapshots, one resynchronization technique uses recovery snapshots or snaps on sites A and B. A snapshot or snap of a storage object or resource generally refers to a point-in-time (PIT) replication of data of a storage resource (e.g., a LUN or volume, a file system), along with its associated snapshot metadata. Such a snapshot can be a full replica (or copy) of the data stored on the storage resource, a partial copy of the data stored on the storage resource, or a space-efficient copy that includes differences between a current version of the data stored on the storage resource at one PIT and an earlier version of the data stored on the storage resource at a prior PIT. Processing can include creating recovery snapshots of the metro volume group GP1 such as, for example, periodically or otherwise in a coordinated manner on the two sites A and B. The recovery snapshots can be leveraged to determine the write requests that might not have been replicated at the time of any fault in the sites A and B, or in the network link therebetween. For example, assuming site B was unavailable and site A continued to service storage clients using its V1 copies of the stretched volumes of GP1, a snapshot difference between two successive snapshots of a stretched volume V1 of site A can be used to synchronize the missing writes on site B which was unavailable or offline due to a fault causing the replication failure.

Following the step S3d of the synchronization phase is a step S3e of the synchronization phase. The step S3e can be performed in an embodiment which uses a witness to decide which of the sites A or B continues servicing I/Os of the metro volume group GP1 in the event of a replication failure or fracture with respect to GP1. The step S3e can include re-engaging the witness, if any. Such re-engaging of the witness can include enabling communications between the sites A and B and transitioning from bias mode back to witness mode.

If a replication link failure occurs when performing the above-noted three phase workflow to change or modify the metro volume group GP1, such as when adding the new stretched LUN 10 described above, the metro volume group GP1 fractures and the preferred site A can stay online servicing I/Os directed to members of GP1 and the site B may not service any I/Os directed to members of GP1. Once the replication link failure is fixed and replication between sites A and B can resume, resynchronization processing can be performed to synchronize the content of all members of GP1 between sites A and B. Generally, any suitable resynchronization technique can be utilized. The resynchronization can use, for example, the most recent crash consistent recovery snapshot of GP1 such as of site A to resynchronize the content of GP1 members on site B. Depending on the resynchronization technique and the particular phase in which the replication link fails and thus the particular phase in which the replication of GP1 fails or fractures, one or more of the members of GP1 can be completely synchronized or copied from site A to site B. For example, if replication link failure occurs during the third phase 3, the synchronization phase, no content of the newly added LUN 10 may have yet been copied from site A to site B. In this case, resynchronization can include copying all content of V1 2554a of site A to V2 2554b of site B.

In at least one embodiment, if the preferred site A fails during the above-noted three phase workflow to change or modify the metro volume group GP1, such as when adding the new stretched LUN 10 described above, the metro volume group GP1 fractures. In response to failure of preferred site A during the foregoing three phase workflow, the workflow can terminate as noted above. Additionally, in at least one embodiment, the non-preferred site B may not be promoted to the role of preferred. As a result, all members of the metro volume group GP1 can transition to an unavailable state over all paths to both sites A and B. In this case, all existing members of GP1 as well as the new member, such as LUN 10 being added, can be unavailable for I/Os to the host 2110a over all paths (e.g., 2108a, 20540 to the sites A and B. Once failed site A recovers such that both preferred site A and non-preferred site B are online, members of GP1 on sites A and B can be resynchronized. The resynchronization can use, for example, the most recent crash consistent recovery snapshot of GP1 such as of site A to resynchronize the content of GP1 members on site B. Depending on the resynchronization technique and the particular phase in which site A fails resulting in GP1 replication fracture or failure, one or more of the members of GP1 can be completely synchronized or copied from site A to site B. For example, if site A failure occurs during the third phase 3, the synchronization phase, no content of the newly added LUN 10 may have yet been copied from site A to site B. In this case, resynchronization can include copying all content of V1 2554a of site A to V2 2554b of site B.

Although the example illustration above using the three phase workflow with a metro volume group, more generally, the techniques of the present disclosure can be used with a metro group of resources or objects. In at least one embodiment, the resources or objects can include any one or more of: volumes, LUNs or logical devices; defined storage areas or portions including individually partitioned sub-LUN, sub volume or sub-logical device portions; files; file systems; virtual volumes or vvols (e.g., storage volumes used with virtual machines); and/or any other suitable storage resource or object.

Although the example illustration above uses the three phase workflow to add a volume or LUN to an existing metro volume group, the techniques of the present disclosure can generally be used with any suitable group change or modification operation with respect to the metro group of objects or resources. For example, the techniques of the present disclosure can be used to perform a metro group change or modification operation which includes any one or more of: adding one or more volumes, LUNs or logical devices to an existing metro group; adding one or more objects or resources to an existing metro group of objects or resources; removing or deleting an object or resource from an existing metro group; resizing the associated storage area and associated logical address space of an existing object of a metro group (e.g., resizing an existing volume, LUN or logical device of a metro volume group which thereby resizes (e.g., increases or decreases) the logical address space associated with the existing volume, LUN or logical device); expanding the associated storage area and associated logical address space of an existing object of a metro group (e.g., expanding the size of an existing volume, LUN or logical device of a metro volume group which thereby increases the logical address space associated with the existing volume, LUN or logical device); decreasing the associated storage area and associated logical address space of an existing object of a metro group (e.g., decreasing the size of an existing volume, LUN or logical device of a metro volume group which thereby decreases the logical address space associated with the existing volume, LUN or logical device); and changing a property or attribute of an existing stretched member object or resource of a currently define metro group (e.g., changing a stretched volume of a metro volume group from read/write to read only).

In at least one embodiment, the commitment phase can include committing the change or modification of the existing stretched volume of the metro volume group GP1 to the MGT DBs 2552a-b respectively of the sites A and B. The change or modification to the existing stretched volume can include resizing the stretched volume by expanding or reducing the stretched volume's storage capacity and associated logical address space. The change or modification to the existing stretched volume can include deleting or removing the stretched volume from the metro volume group GP1. In at least one embodiment, deleting or removing the existing stretched volume from GP1 can include simply removing the stretched volume from the logical group construct or definition of GP1; and also redefining or deconstructing the stretched volume into its two local volumes V1 and V2 where V1 and V2 are now unstretched and not included a replication configuration or replication relationship. For example, assume stretched LUN X1 belongs to GP1 and is configured from a local volume V1 of site A and V2 of site B. In this case, the corresponding local V1 volume of site A and local V2 volume of site B can be unstretched, where V1 (configured as LUN X1) can continue to be used as a regular local volume of site A (e.g., without an associated metro replication configuration), and where V2 (also configured as LUN X1) can continue to be used a regular local volume of site B (e.g., without an associated metro replication configuration). As a variation to the foregoing, the deleted or removed stretched volume can include also deleting the corresponding local V1 and V2 volumes rather than allowing the V1 and V2 volumes to subsequently remain and be used as site local volumes.

In at least one embodiment, if the existing stretched volume is resized, in the synchronization phase, the existing replication session for the metro volume group GP1 can be set to synchronization in progress as noted above when adding a volume to GP1. In such an embodiment, the data mirroring or bi-directional synchronous replication can already be established for the existing stretched volume which is resized. The synchronization performed can be with respect to synchronizing content of the resized existing stretched volume. If the stretched volume is expanded in size, such synchronization can be performed with respect to the newly added expanded logical address space. If the stretched volume is reduced in size such as to reduce the stretched volume's logical address space, such synchronization can include removing, deleting or disassociating any content with the upper bound or upper portion of the logical address space that has been removed. Once any needed synchronization is completed with respect to the resizing of the existing stretched volume of GP1, the replication session for the metro volume group GP1 can be set to synchronized and the metro replication configuration for the metro volume group GP1 can transition to active-active mode.

In at least one embodiment, if the existing stretched volume is deleted or removed from the group, in the synchronization phase, the existing replication session for the metro volume group GP1 can be set to synchronization in progress as noted above. In such an embodiment as part of the synchronization phase, an established or existing bi-directional synchronization replication configuration for the existing stretched volume can be removed corresponding to the deletion or removal of the stretched volume from the group. However, as noted above in at least one embodiment the local volumes V1 of site A and V2 of site B corresponding to the deleted stretched volume can continue to serve as site-local volumes with their current content. As a variation, an embodiment can choose to also remove or delete the local V1 and V2 volumes corresponding to the deleted stretched volume. In this latter scenario, the synchronization phase can include removing or deleting the local V1 and V2 volumes corresponding to the deleted stretched volume. Once any needed synchronization is completed with respect to deleting or removal of the existing stretched volume from the group GP1, the replication session for the metro volume group GP1 can be set to synchronized and the metro replication configuration for the metro volume group GP1 can transition to active-active mode.

In at least one embodiment more generally with respect to a change or modification to an existing member of a metro group, it may be possible to retain the existing established replication configuration in the data path for the modified existing member depending on the particular implementation and type of change or modification. For example, for changing an existing stretched volume of a metro volume group from read/write to read only, the established replication configuration (e.g., in the data path) for the changed stretched volume can be removed since writes are no longer allowed. As another example, resizing an existing stretched volume of the metro volume group may be able to retain the existing established replication configuration of the data path for the stretched volume although resynchronization can be performed.

What will now be described are flowcharts summarizing processing described above, where such processing can be performed in at least one embodiment in accordance with the techniques of the present disclosure.

Figure 7:
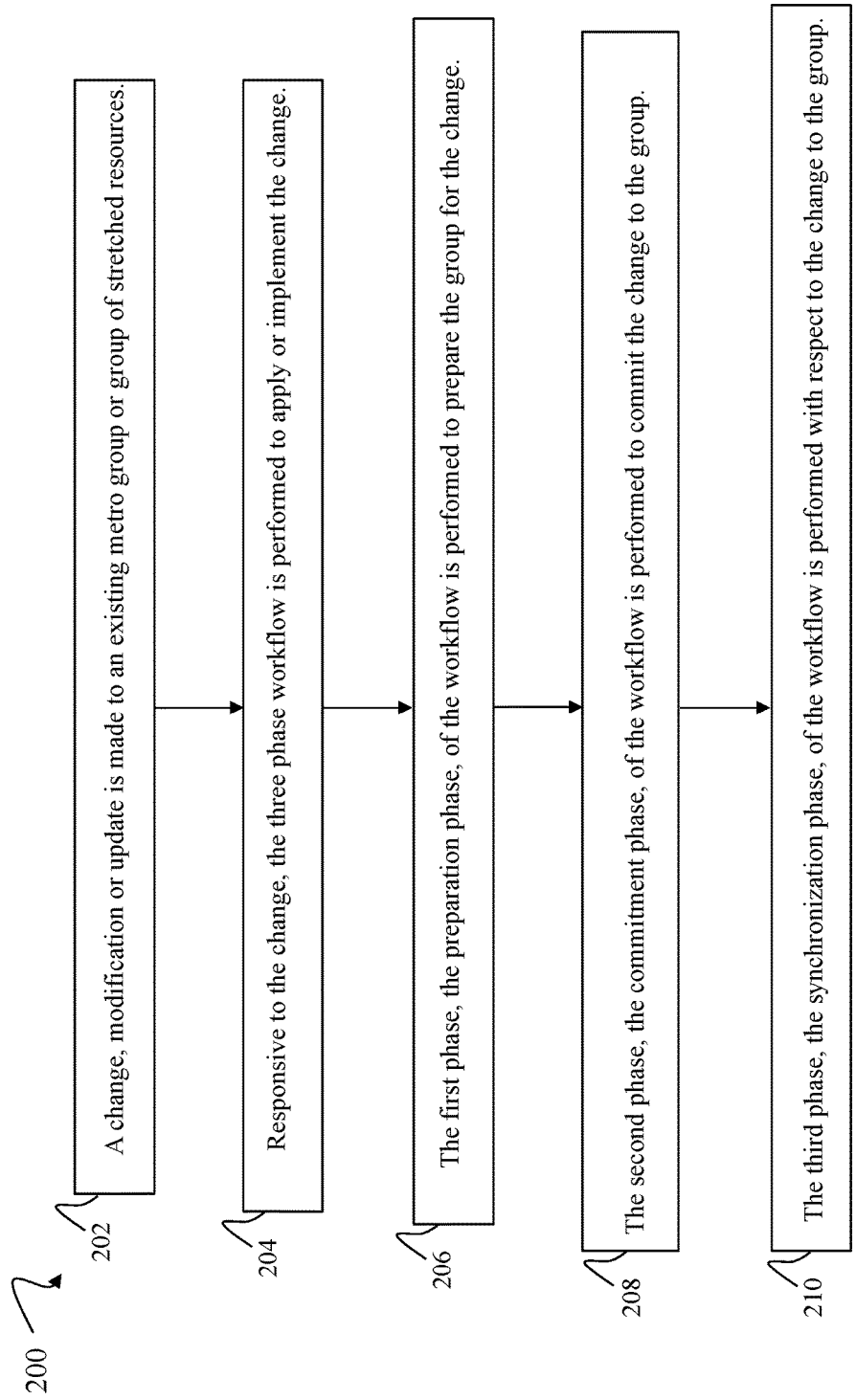

Referring to FIG. 7, shown is a first flowchart 200 of processing steps that can be performed in at least one embodiment in accordance with the techniques of the present disclosure.

At the step 202, a change, modification or update is made to an existing metro group or group of stretched resources. Consistent with other discussion herein, the change can include a change with respect to an existing member of the group and/or a include a change such as by adding a new member to the group. The new member can be a new stretched resource, such as a new stretched volume, being added to the group. In at least one embodiment as described herein, an existing local volume V1 of the preferred site A can be converted to a stretched volume having a counterpart local volume V2 on the non-preferred site B. From the step 202, control proceeds to the step 204.

At the step 204, responsive to the change, the three phase workflow can be performed to apply or implement the change to the group. From the step 204, control proceeds to the step 206 to commence performing the three phase workflow.

At the step 206, the first phase, the preparation phase, of the three phase workflow can be performed to prepare the group for the change. From the step 206, control proceeds to the step 208.

At the step 208, the second phase, the commitment phase, of the three phase workflow can be performed to commit the change to the group. From the step 208, control proceeds to the step 210.

At the step 210, the third phase, the synchronization phase, of the three phase workflow can be performed with respect to the impacted resources due to the change to the group.

Referring to FIG. 8, shown is a second flowchart 300 of processing steps that can be performed in at least one embodiment in accordance with the techniques of the present disclosure. The flowchart 300 of FIG. 8 provides further detail regarding the preparation phase of the step 206 of FIG. 7 in at least one embodiment in accordance with the techniques of the present disclosure.

At the step 302, the metro replication configuration with respect to the group of stretched resources transitions into bias mode. The sites A and B of the metro replication configuration may already be in bias mode or may otherwise transition from a witness mode to bias mode. When in the witness mode, a third system or site C can serve as a witness which is in communication with the sites A and B, where the witness can facilitate selection of a single one of the sites A and B which continues servicing I/Os directed to the group members responsive to a replication failure or fracture with respect to the group.

Transitioning from witness mode to bias mode can include disengaging the witness from its witness role in connection with selecting the foregoing single site responsive to a replication failure or fracture with respect to the group. When in bias mode, only the preferred site can win or be selected as the single site which continues servicing I/Os directed to the group members responsive to a replication failure or fracture with respect to the group. From the step 302, control proceeds to the step 304.

At the step 304, the metro group transitions from active-active mode to active-passive mode. In active-passive mode, a host can issue I/Os, which are directed to members of the group, to only the preferred site but not to the non-preferred site. Transitioning to the active-passive mode can include modifying a path state of any/all paths to the non-preferred site exposing the stretched resources of the group from active to passive. I/Os, which are directed to a member of the group and which are issued from the host over a passive path to the non-preferred site, are not serviced.

Figure 9:
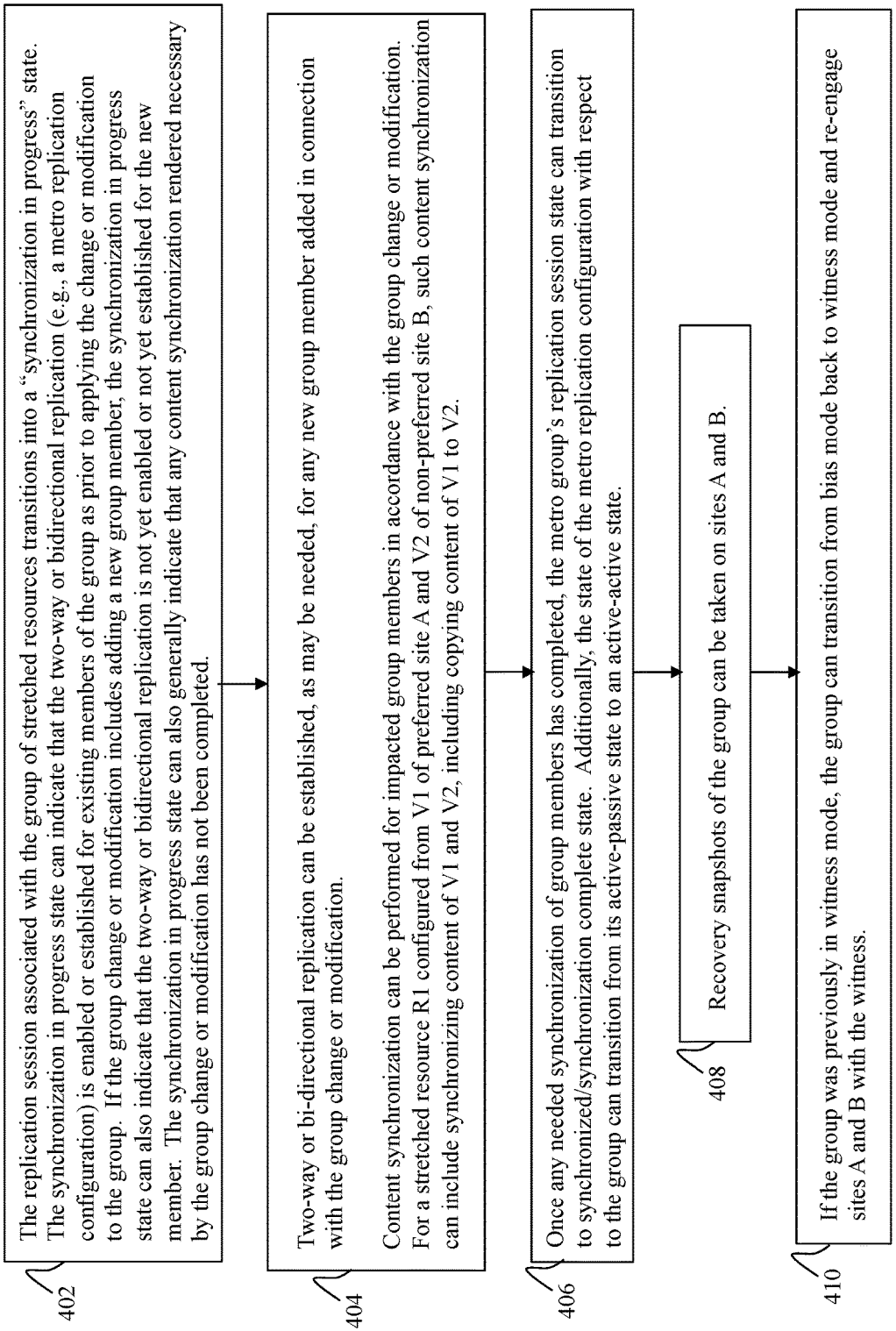

Referring to FIG. 9, shown is a third flowchart 400 of processing steps that can be performed in at least one embodiment in accordance with the techniques of the present disclosure. The flowchart 400 of FIG. 9 provides further detail regarding the synchronization phase of the step 210 of FIG. 7 in at least one embodiment in accordance with the techniques of the present disclosure.

At the step 402, the replication session associated with the group of stretched resources transitions into a "synchronization in progress" state. The synchronization in progress state can indicate that the two-way or bidirectional replication (e.g., a metro replication configuration) is enabled or established for existing members of the group as prior to applying the change or modification to the group. If the group change or modification includes adding a new group member, the synchronization in progress state can also indicate that the two-way or bidirectional replication is not yet enabled or not yet established for the new member. The synchronization in progress state can also generally indicate that any content synchronization rendered necessary by the group change or modification has not been completed. From the step 402, control proceeds to the step 404.

At the step 404, two-way or bi-directional replication can be established, as may be needed, for any new group member added in connection with the group change or modification. Content synchronization can be performed for impacted group members in accordance with the group change or modification. For a stretched resource R1 configured from V1 of preferred site A and V2 of non-preferred site B, such content synchronization can include synchronizing content of V1 and V2, including copying content of V1 to V2. From the step 404, control proceeds to the step 406.

At the step 406, once any needed synchronization of group members has completed, the metro group's replication session state can transition to a synchronized or synchronization complete state. Additionally, the state of the metro replication configuration with respect to the group can transition from its active-passive state to an active-active state. From the step 406, control proceeds to the step 408.

At the step 408, recovery snapshots of the group can be taken on sites A and B. From the step 408, control proceeds to the step 410.

At the step 410, if the group was previously in witness mode, the group can transition from bias mode back to witness mode and re-engage sites A and B with the witness.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    establishing a synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host, wherein the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous replication, wherein there is synchronous replication of writes from the first local resource of the first site to the second local resource of the second site for said each existing stretched resource, and synchronous replication of writes from the second local resource of the second site to the first local resource of the first site for said each existing stretched resource; and
    performing first processing to implement a change or modification operation of the group of one or more existing stretched resources, wherein said first processing includes:
        performing a preparation phase that prepares the group for the change or modification operation of the group;
        performing a commitment phase that commits the change or modification operation to the group; and
        performing a synchronization phase that synchronizes content of the group in accordance with the change or modification operation to the group, wherein the synchronization phase includes synchronizing content of a first stretched resource of the group between a corresponding first local resource of the first site and a corresponding second local resource of the second site, wherein the first stretched resource is added as a new stretched resource to the group by the change or modification operation of the group, and wherein the synchronization phase includes:
    transitioning a replication session associated with the group to a synchronization in progress state indicating that content is not synchronized for at least the first stretched resource of the group, and
    wherein when in the synchronization in progress state of the synchronization phase, bi-directional or two-way synchronous replication as between the first site and the second site is not yet established for the new stretched resource being added to the group, and
    wherein when in the synchronization in progress state of the synchronization phase, bi-directional or two-way synchronous replication as between the first site and the second site remains established for each of the one or more existing stretched resources which are members of the group prior to performing said first processing to implement the change or modification operation of the group.

2. The computer-implemented method of claim 1, wherein the first site is configured as a preferred site and the second site is configured as a non-preferred site.

3. The computer-implemented method of claim 1, wherein prior to performing said first processing, the one or more existing stretched resources of the group are in an active-active mode in the synchronous replication configuration wherein the first path is configured as active with respect to the one or more existing stretched resources of the group so the host issues I/Os directed to the one or more existing stretched resources of the group over the first path, and wherein the second path is configured as active with respect to the one or more existing stretched resources of the group so the host issues I/Os directed to the one or more existing stretched resources of the group over the second path.

4. The computer-implemented method of claim 3, wherein the preparation phase includes:
configuring the first site and the second site in a bias mode with respect to the synchronous replication configuration for the group, wherein when in the bias mode, a specified one of the first site and the second site currently configured as the preferred site is designated as a single site which services I/Os directed to stretched resources of the group responsive to a failure or fracture of replication with respect to the group, and wherein when in the bias mode and responsive to a failure or fracture of replication with respect to the group, the non-preferred site is unavailable for servicing I/Os directed to any stretched resource of the group; and
transitioning the one or more existing stretched resources of the group into an active-passive mode in the synchronous replication configuration wherein the first path to the first site, designated as the preferred site, is configured as active with respect to the one or more existing stretched resources of the group where the host issues I/Os directed to the one or more existing stretched resources of the group over the first path, and wherein the second path to the second site, designated as the non-preferred site, is configured as passive with respect to the one or more existing stretched resources of the group where the host is unable to issue I/Os directed to the one or more existing stretched resources of the group over the second path.

5. The computer-implemented method of claim 4, wherein said configuring the first site and the second site in the bias mode further includes:
transitioning the first site and the second site from a witness mode to the bias mode; and
wherein subsequent to completing the first processing, the method includes:
transitioning from the bias mode back to the witness mode, and wherein when in the witness mode, a third site or system serves as a witness and is configured for communication with the first site and the second site, and wherein responsive to a failure or fracture of replication with respect to the group, the witness is used in deciding which of the first site and the second site continues servicing I/Os directed to stretched resources of the group.

6. The computer-implemented method of claim 1, wherein the commitment phase includes:
committing the change or modification operation to a first management database on the first site; and
committing the change or modification operation to a second management database on the second site.

7. The computer-implemented method of claim 1, wherein the first stretched resource is configured from the corresponding first local resource of the first site and the corresponding second local resource of the second site, and wherein the corresponding first local resource includes content prior to adding the first stretched resource to the group, and wherein said synchronization phase includes copying content from the corresponding first local resource to the corresponding second local resource.

8. The computer-implemented method of claim 1, wherein the synchronization phase includes:
determining that content of the first stretched resource of the group having a first identity is synchronized between the corresponding first local resource of the first site and the corresponding second local resource of the second site, wherein the corresponding first local resource and the corresponding second local resource are both configured to have the same resource identity, the first identity; and
responsive to determining that content of the first stretched resource of the group is synchronized, transitioning the replication session to a synchronous state and transitioning the synchronous replication configuration for the group from the active-passive mode to the active-active mode wherein the first path is configured as active with respect to stretched resources of the group where the host issues I/Os directed to the stretched resources of the group over the first path, and wherein the second path is configured as active with respect to the stretched resources of the group where the host issues I/Os directed to the stretched resources of the group over the second path.

9. The computer-implemented method of claim 1, wherein subsequent to completing the first processing, the method includes:
creating a first recovery snapshot of the group on the first site; and
creating a second recovery snapshot of the first group on the second site.

10. The computer-implemented method of claim 1, wherein the change or modification operation of the group includes deleting or removing one or more of the existing stretched resources from the group.

11. The computer-implemented method of claim 1, wherein the change or modification operation of the group includes resizing a first of the one or more existing stretched resources of the group.

12. The computer-implemented method of claim 11, wherein said resizing the first existing stretched resource of the group includes expanding a current size of the first existing stretched resource to a second larger size, and wherein said expanding includes increasing an associated logical space of the first existing stretched resource from the current size to the second larger size.

13. The computer-implemented method of claim 11, wherein said resizing the first existing stretched resource of the group includes decreasing a current size of the first existing stretched resource to a second smaller size, and wherein said decreasing includes decreasing an associated logical address space of the first existing stretched resource from the current size to the second smaller size.

14. The computer-implemented method of claim 1, wherein the one or more existing stretched resources include one or more of: a volume, a logical device; a file; a file system; a sub-volume portion; a virtual volume used by a virtual machine; a portion of a virtual volume used by a virtual machine; and a portion of a file system.

15. A system comprising:
one or more processors; and
a memory comprising code stored thereon that, when executed, performs a method comprising:
establishing a synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host, wherein the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous replication, wherein there is synchronous replication of writes from the first local resource of the first site to the second local resource of the second site for said each existing stretched resource, and synchronous replication of writes from the second local resource of the second site to the first local resource of the first site for said each existing stretched resource; and performing first processing to implement a change or modification operation of the group of one or more existing stretched resources, wherein said first processing includes:

performing a preparation phase that prepares the group for the change or modification operation of the group;

performing a commitment phase that commits the change or modification operation to the group; and performing a synchronization phase that synchronizes content of the group in accordance with the change or modification operation to the group, wherein the synchronization phase includes synchronizing content of a first stretched resource of the group between a corresponding first local resource of the first site and a corresponding second local resource of the second site, wherein the first stretched resource is added as a new stretched resource to the group by the change or modification operation of the group, and wherein the synchronization phase includes:

transitioning a replication session associated with the group to a synchronization in progress state indicating that content is not synchronized for at least the first stretched resource of the group, and wherein when in the synchronization in progress state of the synchronization phase, bi-directional or two-way synchronous replication as between the first site and the second site is not yet established for the new stretched resource being added to the group, and wherein when in the synchronization in progress state of the synchronization phase, bi-directional or two-way synchronous replication as between the first site and the second site remains established for each of the one or more existing stretched resources which are members of the group prior to performing said first processing to implement the change or modification operation of the group.

16. A non-transitory computer-readable memory comprising code stored thereon that, when executed, performs a method comprising:

establishing a synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host, wherein the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous replication, wherein there is synchronous replication of writes from the first local resource of the first site to the second local resource of the second site for said each existing stretched resource, and synchronous replication of writes from the second local resource of the second site to the first local resource of the first site for said each existing stretched resource; and performing first processing to implement a change or modification operation of the group of one or more existing stretched resources, wherein said first processing includes:

performing a preparation phase that prepares the group for the change or modification operation of the group;

performing a commitment phase that commits the change or modification operation to the group; and performing a synchronization phase that synchronizes content of the group in accordance with the change or modification operation to the group, wherein the synchronization phase includes synchronizing content of a first stretched resource of the group between a corresponding first local resource of the first site and a corresponding second local resource of the second site, wherein the first stretched resource is added as a new stretched resource to the group by the change or modification operation of the group, and wherein the synchronization phase includes:

transitioning a replication session associated with the group to a synchronization in progress state indicating that content is not synchronized for at least the first stretched resource of the group, and wherein when in the synchronization in progress state of the synchronization phase, bi-directional or two-way synchronous replication as between the first site and the second site is not yet established for the new stretched resource being added to the group, and wherein when in the synchronization in progress state of the synchronization phase, bi-directional or two-way synchronous replication as between the first site and the second site remains established for each of the one or more existing stretched resources which are members of the group prior to performing said first processing to implement the change or modification operation of the group.

\* \* \* \* \*